April 4, 1944.   T. NELSON   2,345,768
SHIELDED LOCK CLIP
Filed Feb. 20, 1943
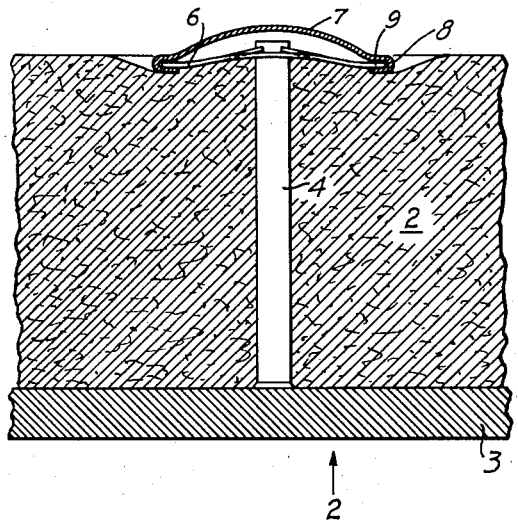
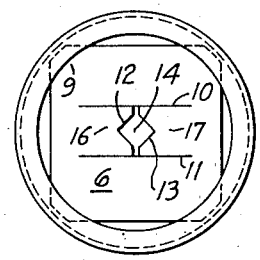
INVENTOR
TED NELSON
BY *Charles S. Evans*
HIS  ATTORNEY Patented Apr. 4, 1944

2,345,768

UNITED STATES PATENT OFFICE 2,345,768

SHIELDED LOCK CLIP

Ted Nelson, San Leandro, Calif.

Application February 20, 1943, Serial No. 476,519

1 Claim. (Cl. 85—36)

My invention relates to a lock clip and particularly to a shielded lock clip; and one of the objects of my invention is the provision of a clip which may be pushed over the end of a stud and which securely grips the stud to retain its position thereon against force tending to push it off.

Another object is the provision of an automatically locking clip mounted within a shield which conceals and protects it and the end of the stud on which it is mounted.

My invention possesses other objects and features of advantage, some of which, with the foregoing, will be set forth in the following description of my invention. It is to be understood that I do not limit myself to the showing made by the said description, and the drawing, as I may adopt variant forms of my invention within the scope of the appended claim.

In the drawing which is on an enlarged scale,

Figure 1 is a side elevation of a shielded clip embodying my invention. The device is shown applied to a stud for the purpose of securing a layer of insulation in place.

Figure 2 is a plan view of my shielded lock clip, the direction of the view being indicated by the arrow 2 in Figure 1.

The value of thermal insulation is widely recognized, but methods and means for attaching the insulating layer to the underlying structure have been a difficult problem, especially if the element of cost has had a controlling influence. Where the underlying structure was metal, as in shipbuilding and many forms of non-marine construction, the problem of fastening insulation effectively and cheaply has been a difficult one.

With the relatively recently developed method and means of welding studs to a plate or other structural element, by pushing the welding end of the stud through the insulating layer, the problem has been met in part; and it is the broad purpose of the present invention to complete the solution by the provision of a self-locking head which may be easily and quickly applied to the free end of the stud to hold the insulating layer in place.

In detail and with reference to the figures of the drawing, the insulation layer 2 is applied to the wall or plate 3 and held in position by temporary means of any suitable character. One or two of the studs 4 may be welded in place prior to the application of the insulation, and the insulation pushed over these studs, the other studs for holding the insulation layer then being pushed through the insulation and welded to the plate 3.

The length of the stud is such as to project a small amount beyond the surface of the insulating layer and where the insulation is relatively hard and of a constant thickness, the studs are sized as to length prior to their application. In circumstances where the insulation is of a softer character or perhaps varying somewhat in thickness, the projecting ends of the stud may be clipped off by a pair of clippers laid against the surface of the insulation and pinching off the end to leave the stud projecting a short distance. The shielded lock nut of my invention is then merely pushed over the end of the stud firmly enough to seat the peripheral edges of the device securely in the insulation; the amount of penetration depending of course upon the softness of the insulating layer. In Figure 1 a relatively soft insulation layer is shown and the shielded lock clip is buried sufficiently so that it projects as a whole only a small amount beyond the plane of the surface of the insulating layer.

The shielded lock clip according to circumstances will vary in size and the proportion of parts. For a soft insulation the diameter will be relatively large and for a stiff and hard insulation, where the device does not bed itself in the surface, the diameter is quite small. Essentially however the lock clip of my invention comprises two pieces, the locking plate 6 and the shield 7. The shield 7 formed of quite thin material, preferably metal but also being capable of formation of various of the plastics, is of shallow dish form and its peripheral edges 8 are spun or pressed inwardly to form a recess in which the corners 9 of the locking plate are caught. Whether the locking plate is square as shown in Figure 2 or whether it is longer than it is wide, as may be the case in constructions intended for specific purposes, the corners or edges of the locking plate are caught and held by the folded over peripheral edge of the shield. The plate is made of thin spring steel; and means are provided at its center for automatically engaging the end of the stud and securely locking itself to the stud when the device is pushed thereover. A preferred form of locking means is provided by four severing cuts through the body of the spring plate. Two of these cuts 10 and 11 are parallel to each other and spaced apart a distance of about twice the diameter of the stud with which the device is to be used. Traverse cuts 12 and 13 then create an aperture 14 preferably square in shape, the sides of which are spaced apart a distance somewhat less than the diameter of the stud which is to be engaged and providing two sharp edges on the free end of tongues 16 and 17. As the device is pressed over the stud, the tongues 16 and 17 are flexed to one side to bring the edges 12 and 13 into engagement with the side of the stud. Pressure applied to remove the device from the stud merely tends to bury the engaging edges of the tongues in the body of the stud so that disengaging movement is prevented and the device is locked securely in place, the crowned shield plate completely concealing the lock plate and stud end.

I claim:

A fastener comprising a crowned circular imperforate shield plate having its peripheral edge folded under and inwardly to provide an inwardly opening shallow annular recess, a substantially square lock plate having its extreme corner portions only seated in said recess whereby the two plates are held together and the major portion of the plate is free, said lock plate having resilient rectangular tabs formed therein to resiliently engage the surface of a stud on which the fastener is pressed to resist backing the fastener off of the stud.

TED NELSON.